United States Patent
Ohtani

[19]

[11] Patent Number: 6,108,099
[45] Date of Patent: Aug. 22, 2000

[54] IMAGE FORMING APPARATUS AND MANAGEMENT SYSTEM THEREFOR

[75] Inventor: Masahito Ohtani, Atsugi, Japan

[73] Assignee: Ricoh Company, Ltd., Tokyo, Japan

[21] Appl. No.: 09/108,344

[22] Filed: Jun. 30, 1998

[30] Foreign Application Priority Data

Jul. 8, 1997 [JP] Japan ................................. 9-196422

[51] Int. Cl.⁷ .................................................. G06F 15/00
[52] U.S. Cl. .................. 358/1.15; 358/434; 358/437; 358/439; 358/468; 358/1.14; 379/100.06; 399/11; 399/21; 399/23; 399/18
[58] Field of Search .................... 358/1.13, 1.14, 358/1.15, 405, 407, 434, 435, 437, 439, 468; 399/11, 8, 9, 18, 19, 23; 705/22, 26, 28; 700/236, 241, 244; 340/825.35; 235/385

[56] References Cited

U.S. PATENT DOCUMENTS 5,127,047 6/1992 Bell et al. ................................. 358/439
5,373,349 12/1994 Ito ............................................ 358/438

FOREIGN PATENT DOCUMENTS 8-63300 3/1996 Japan .

Primary Examiner—Edward L. Coles
Assistant Examiner—Mark Wallerson
Attorney, Agent, or Firm—Cooper & Dunham LLP

[57] ABSTRACT

An image forming apparatus includes, a network interface for connecting the image forming apparatus to a network as a network terminal, an electronic mail communication control unit for communicating an electronic mail with another network terminal through said network interface, a memory for storing an address of a predetermined network terminal, a sensor for detecting an abnormal condition of the image forming apparatus, a controller for producing the electronic mail according to the address stored in the memory, and wherein the electronic mail communication control unit sends an electronic mail produced by the controller to the predetermined network terminal when the sensor detects an abnormal condition such as when the sensor detects a paper jam, toner empty and paper-out.

42 Claims, 7 Drawing Sheets

```
Date: Fri, 27 Jun 97  11:23:36
From: fax@xxx.co.jp
To  : syomu@xxx.co.jp
Reply-to: paper@zzz.co.jp
Subject: no paper Paper-out condition has occurred.
In case of necessity, please fill out a form and
order the recording paper.
-----------------------------------------------------
        RECORDING PAPER PURCHASE ORDER FORM
   SIZE OF PAPER : _____
   NUMBER        : _____
   NAME          : _____
```

|  | E-MAIL ADDRESS |
|---|---|
| WHERE TO NOTIFY OF ABNORMAL CONDITIONS | syomu @ xxx. co. jp |
| WHERE TO ORDER PAPER | paper @ zzz. co. jp |
| WHERE TO ORDER TONER | toner @ yyy. co. jp |

Fig. 4

```
Date: Fri, 27 Jun 97  11:23:36
From: fax@xxx.co.jp
To  : syomu@xxx.co.jp
Reply-to: paper@zzz.co.jp
Subject: no paper
```

```
Paper-out condition has occurred.
In case of necessity, please fill out a form and
order the recording paper.
-----------------------------------------------------------------
       RECORDING PAPER PURCHASE ORDER FORM
    SIZE OF PAPER : _____
    NUMBER        : _____
    NAME          : _____
```

Fig. 6

```
Date: Fri, 27 Jun 97  11:23:36
From: fax@xxx.co.jp
To  : syomu@xxx.co.jp
Subject: paper jam
```

```
A paper jam has occurred, please return the
facsimile machine to its original state.
```

Fig. 7

```
Date: Fri, 27 Jun 97   11:23:36
From: fax@xxx.co.jp
To  : syomu@xxx.co.jp
Reply-to: toner@zzz.co.jp
Subject: no toner
```

```
A toner empty condition has occurred.
In case of necessity, please fill out a form and
order the toner bottle.
------------------------------------------------------------
         TONER BOTTLE PURCHASE ORDER FORM
    MODEL No : _____
    NUMBER   : _____
    NAME     : _____
```

Fig. 8

IMAGE FORMING APPARATUS AND MANAGEMENT SYSTEM THEREFOR

BACKGROUND

1. Field of the Invention

This invention relates to an image forming apparatus such as a facsimile machine, a copy machine, printer, and the like, connected to a communication network such as a LAN (local area network) and, more particularly, to an image forming apparatus having a function for sending an electronic mail to another network terminal.

2. Description of the Related Art

A conventional image forming apparatus, such as a facsimile machine, a copy machine, a printer, has an indicator or display which indicates or displays some information for operator viewing. When abnormal conditions are encountered, the conventional image forming apparatus notifies an operator by lighting up an indicator or displaying guidance information on a display.

In the image forming apparatus, representative examples of abnormal conditions include paper-out, paper jam and toner empty. The operator becomes aware of the abnormal conditions when they go to the place where the image forming apparatus is placed and watch the indicator or display.

Accordingly, in a conventional image forming apparatus, there is a problem that nobody will be aware of the abnormal conditions of the apparatus until they go to the place where the image forming apparatus is placed.

A method and mechanism for reporting an error of a printer device is described in Japanese Laid-Open Patent Application No. 8-63300.

In this method and mechanism, the definitions of a data information line and other two control signal lines are altered from the printer device and error information defined with the combination of the information line and newly defined two control lines and reported. So, this method and mechanism increases error factors to be reported without altering a parallel interface which is widely used between a personal computer and a printer device.

However, although this method and mechanism works when a printer device is connected to a personal computer in a one-to-one relationship, they are not considered to apply to a communication network like a LAN. Further, there are constraints of reporting timing in this method and mechanism because they report error information to a personal computer through the use of control communications between a personal computer and printer device.

When the cause of abnormal conditions in the image forming apparatus is the paper-out or toner empty, the operator replenishes the paper or toner according to the indicating, displaying or reporting. But, when there is no backup supply of toner or paper, the image forming apparatus can not be used, since the paper or toner can not immediately be replenished.

Another type of image forming apparatus calls a service center and orders the paper or toner automatically when it detects a paper-out or toner empty.

In this case, the image forming apparatus may call and order the paper or toner even though there is a backup supply already available.

SUMMARY OF THE INVENTION

The present invention is achieved by an image forming apparatus comprising, a network interface for connecting the image forming apparatus to a network as a network terminal, an electronic mail communication control unit for communicating an electronic mail with other network terminals through said network interface, a memory for storing an address of a predetermined network terminal, a sensor for detecting an abnormal condition of the image forming apparatus, a controller for producing the electronic mail according to the address stored in the memory. The electronic mail communication control unit sends an electronic mail produced by the controller to the predetermined network terminal when the sensor detects an abnormal condition.

The present invention is further achieved by an image forming apparatus management system comprising, a network terminal having a network interface for connecting the network terminal to a network as a network terminal, an image forming apparatus having, a network interface for connecting the image forming apparatus to the network, a network terminal, an electronic mail communication control unit for communicating an electronic mail with other network terminals through said network interface, a memory for storing an address of the network terminal, a sensor for detecting an abnormal condition of the image forming apparatus, a controller for producing the electronic mail according to the address stored in the memory. The electronic mail communication control unit sends an electronic mail produced by the controller to the network terminal when the sensor detects an abnormal condition.

BRIEF DESCRIPTION OF THE DRAWINGS

Embodiments of the present invention will be described by reference to the accompanying drawings in which like numbers represent like or similar elements.

FIG. 4 is an E-mail address table of a facsimile apparatus in FIG. 1;

FIG. 6 is an example of an E-mail format according to an embodiment of the present invention;

FIG. 7 is another example of an E-mail format according to an embodiment of the present invention; and FIG. 8 is further example of an E-mail format according to an embodiment of the present invention.

DETAILED DESCRIPTION OF THE PREFERRED EMBODIMENTS

The image forming apparatus according to an embodiment of the present invention may be used in facsimile machines, copy machines, printers, and the like, that are connected to a communication network like a LAN (local area network) and have a function for sending an electronic mail to a destination terminal.

Figure 1:
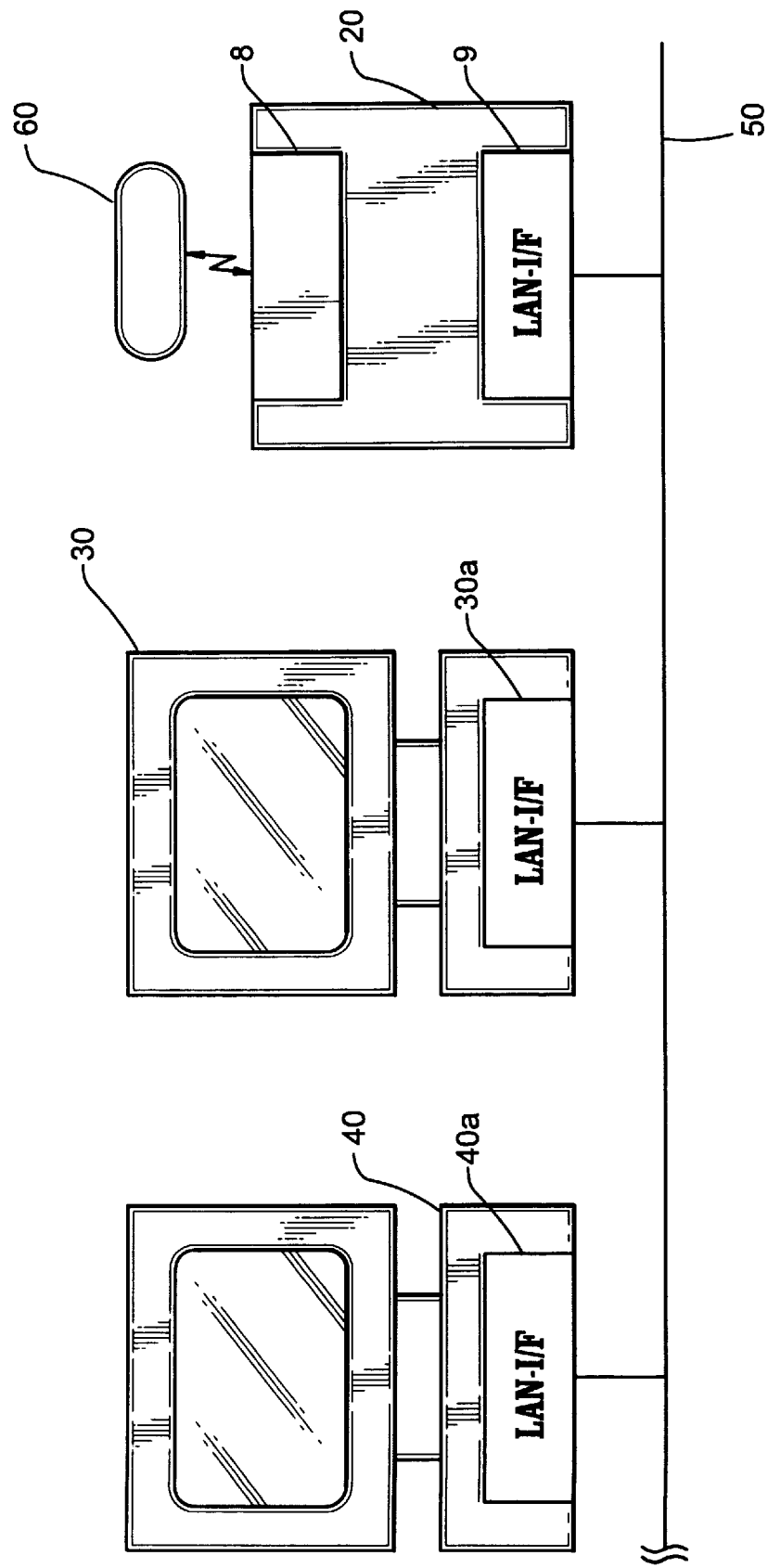
FIG. 1 is a block diagram schematically showing a network system according to an embodiment of the present invention.
Figure 2:
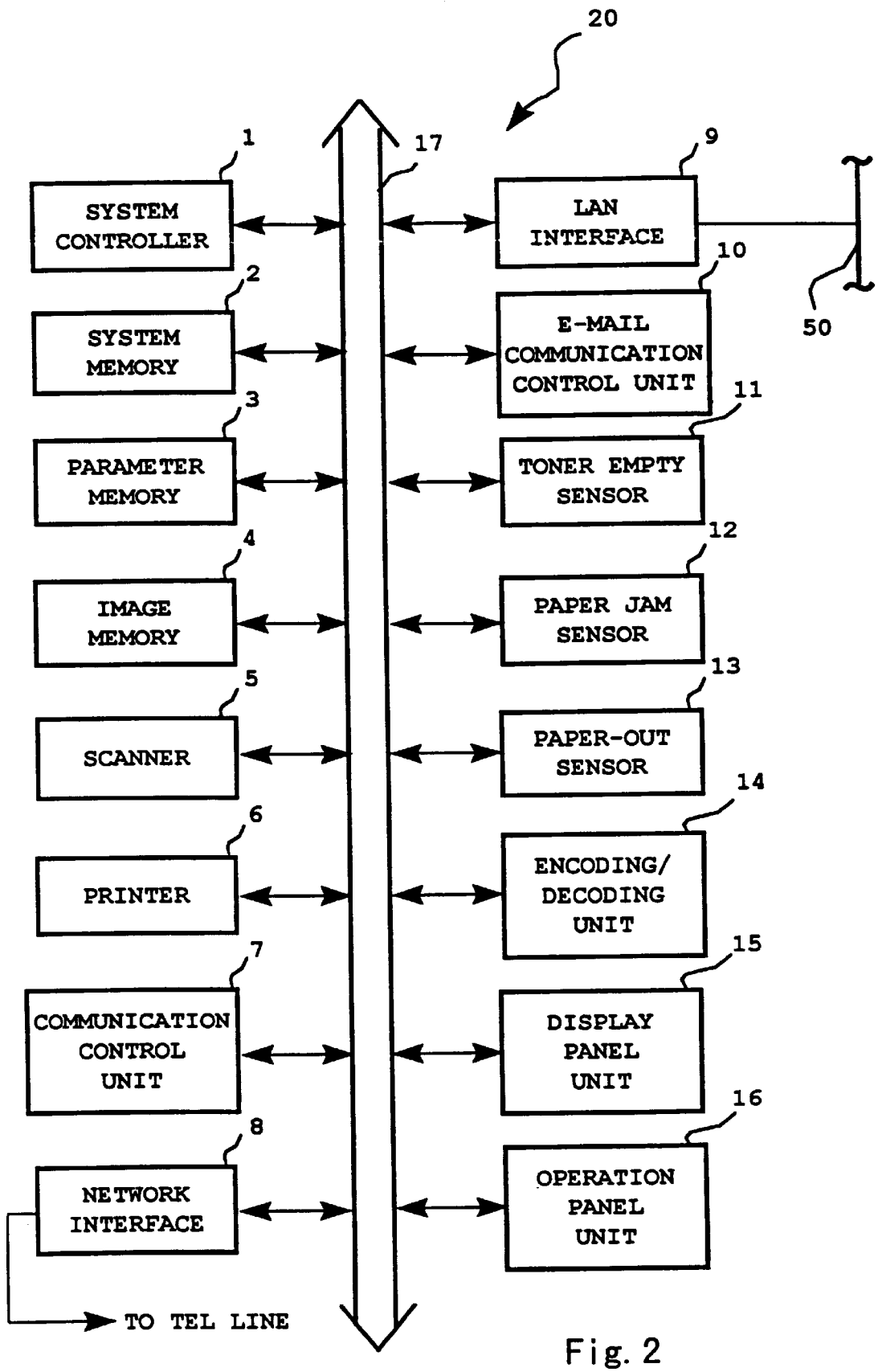
FIG. 2 is a block diagram of a facsimile apparatus in FIG. 1.

However for convenience, the image forming apparatus will only be described in use with a facsimile machine, such as the machine shown in FIGS. 1 and 2.

In FIG. 1, a facsimile machine 20, a personal computer 30 and a server 40 are connected to LAN 50 as network terminals. The facsimile machine 20, personal computer 30 and server 40 have a function for sending and receiving electronic mail (E-mail) to/from each other through the LAN 50 using communications procedures which are explained later.

The facsimile machine 20 is connected to a PSTN (public switched telephone network) 60 through a network interface 8 and to a LAN 50 through the LAN interface 9, and includes general facsimile functions including a group 3 facsimile communications function for sending and receiving facsimile image information.

The personal computer 30 is connected to LAN 50 through the LAN interface 30a. In FIG. 1, the personal computer 30 shows a representative example of a client terminal. In actuality, many client terminals including personal computers may be connected to the LAN 50.

The server 40 has the function of a mail server and a file server, and is connected to LAN 50 through the LAN interface 40a. When the network terminals including the facsimile machine 20 and personal computer 30 send E-mail to another terminal connected to the LAN 50 or a destination client terminal connected to a wide-area network like the Internet, the sent E-mail is first stored in the server 40 and is then sent to an addressed terminal.

Generally, a so-called protocol suite is applied for communications between network terminals connected to LAN 50. In an operation of the protocol suite, a communication protocol such as the so-called TCP/IP (transmission control protocol/internet protocol) is used in combination for communications up to a transport layer of the OSI (open systems interconnection) stack, and for communications through layers higher than the transport layer, respectively. For example, an SMTP (simple mail transfer protocol) is used as a higher layer protocol for communications such as E-mail.

Each of the above-mentioned communication protocols, such as the TCP/IP, SMTP, as well as the data format and structure of the E-mail are defined in a RFC (request for comments) published by IETF (Internet engineering task force). For example, the TCP and IP are defined in RFC793, the SMTP is defined in RFC821, and the data format and structure of the E-mail in RFC822, RFC1521, RFC1522, and RFC1468.

The network terminals have the function of sending and receiving E-mail having the data format and structure defined in the RFCs.

Next, an exemplary structure of the facsimile machine 20 is explained with reference to FIG. 2.

In FIG. 2 the facsimile machine 20 has a system controller 1, a system memory 2, a parameter memory 3, an image memory 4, a scanner 5, a printer 6, a communication control unit 7, a network interface 8, a LAN interface 9, an E-mail communication control unit 10, a toner empty sensor 11, a paper jam sensor 12, a paper-out sensor 13, an encoding/decoding unit 14, a display panel unit 15, an operation panel unit 16, and an internal bus 17.

The system controller 1 controls the operation of the facsimile machine 20 and, specifically, performs various kinds of controls, including a facsimile data transmission control for sending and receiving image information. The system memory 2 stores control programs to be performed by the system controller 1 and various kinds of data necessary for the execution of the control programs. The parameter memory 3 stores various kinds of parameters and information specific to the network facsimile machine 20. In addition, the parameter memory 3 includes a working memory area reserved for use of the system controller 1.

The image memory 4 stores the compressed image data to be transmitted and the received data from the other facsimile machine. The scanner 5 reads original documents at a predetermined resolution and produces an image signal. The printer 6 has an electrophotographic printer engine and prints out an image on a recording paper fed from a sheet cassette one by one. The electrophotographic printer engine includes a photoconductive drum and developing device, and develops a latent image formed on the photoconductive drum by toner supplied from a toner bottle.

The communication control unit 7 controls the network interface 8 and includes a modem that performs functions of a modem for, e.g., a group 3 facsimile machine, and includes a low-speed modem function, such as a V.21 modem, for transmitting and receiving communication protocols and a high-speed modem function, such as V.17, V.34, V.29, V.27ter modems, for mainly transmitting and receiving image information. The network interface 8 includes an automatic sending and receiving function and controls the connection and disconnection of the facsimile machine 20 to the PSTN 60.

The LAN interface 9 interfaces the connection between the facsimile machine 20 and the LAN 50 and controls the communication with other network terminals on the basis of the TCP/IP. The E-mail communication control unit 10 controls the E-mail communication on the basis of the SMTP.

The toner empty sensor 11 is provided in the printer 6 and detects an empty state of the toner bottle. The paper jam sensor 12 is provided in the printer 6 and detects a paper jam in a paper feeding passage. The paper-out sensor 13 is provided in the printer 6 and detects when the sheet cassette is out of paper.

The encoding/decoding unit 14 encodes an image signal of the original document and compresses the image signal for transmission, and decodes the compressed received information into a format for printing.

The display panel unit 15 includes a display panel and indicators and displays guidance and other information for operator viewing. The operation panel unit 16 includes various kinds of operational keys for inputting a command and parameter information and for setting operational modes of the facsimile machine 20.

The internal bus 17 is connected to the system controller 1, system memory 2, parameter memory 3, image memory 4, scanner 5, printer 6, communication control unit 7, network interface 8, LAN interface 9, E-mail communication control unit 10, toner empty sensor 11, paper jam sensor 12, paper-out sensor 13, encoding/decoding unit 14, display panel unit 15, operation panel unit 16 and allows communications between the different devices.

A preferred embodiment of the facsimile machine 20 of the present invention is arranged in this way.

The facsimile machine 20 calls a destination terminal and sends the image signal, and is called from the destination terminal and prints out the image on a recording paper. In due time, the remaining amount of recording paper in the sheet cassette and the toner in toner bottle decreases by degrees. In addition, it may happen that the recording paper jams in the paper feeding passage.

Accordingly, the facsimile machine 20 needs to swiftly notify some party about the abnormal conditions when the facsimile machine 20 detects a paper-out, toner empty or paper jam.

In this embodiment of the present invention, the facsimile machine 20 uses E-mail for forwarding, notice of the abnormal conditions. The following are operations performed by the facsimile machine 20 to notify of the abnormal conditions.

Figure 3:
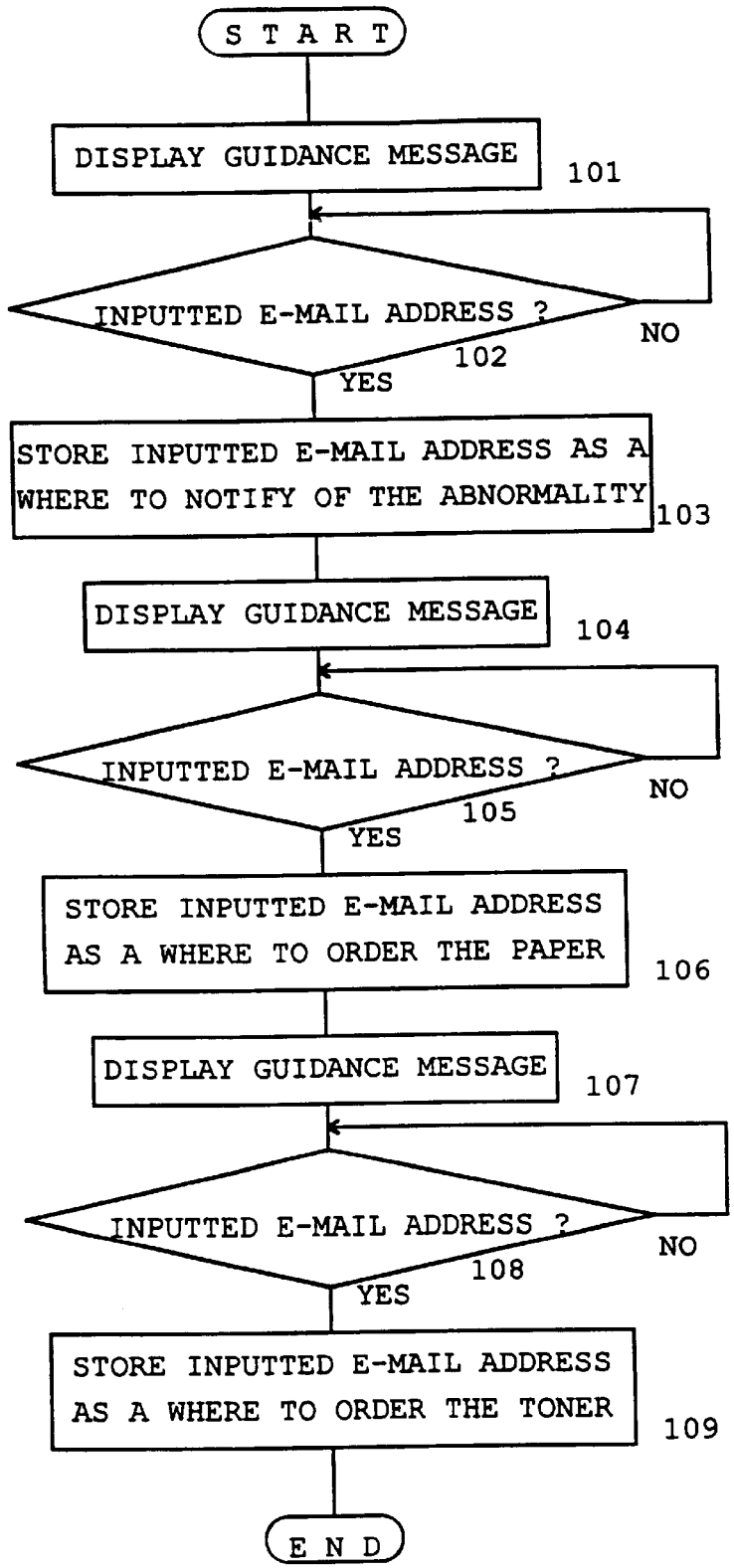
FIG. 3 is a now chart for a mail address storing operation according to an embodiment of the present invention.

Turning now to FIG. 3, a description will be given of an E-mail address storing operation according to an embodiment of the present invention.

In step 101, initially the system controller 1 generates a guidance message on the display panel unit 15 which encourages an input of an E-mail address for notice of the abnormal conditions when there is a key operation to set a mail address storing mode in motion.

Then, the system controller 1 keeps a watch waiting for on input of the E-mail address (102). When an operator has inputted the E-mail address (Yes in step 102), the system controller 1 stores the inputted E-mail address in the parameter memory 3. The E-mail address indicates where and whom to notify of the abnormal conditions (103).

Next, the system controller 1 generates a guidance message on the display panel unit 15 which encourages an input of an E-mail address to be used to order the paper (104). When an operator has inputted the E-mail address (Yes in step 105), the system controller 1 stores the inputted E-mail address in the parameter memory 3. This E-mail address indicates where to order the paper(106).

The system controller 1 then generates a guidance message on the display panel unit 15 Which encourages an input of an E-mail address to be used to order the toner (107). When an operator has inputted the E-mail address (Yes in step 108), the system controller 1 stores the inputted E-mail address in the parameter memory 3. This E-mail address indicates where to order the toner (108).

One example of the E-mail address table stored in the parameter memory 3 is shown in FIG. 4.

In FIG. 4, the E-mail address indicating where to notify of the abnormal conditions is stored in step 103 in FIG. 3 as [syomu @ xxx. co.jp], and this is an assigned address for an official responsible for the facsimile machine 20 in the LAN 50. Further, the E-mail address indicating where to order the paper is stored in step 106 in FIG. 3 as [paper @ zzz. co.jp], and this is an address of a dealer that handles the recording paper and the address is also typically in a wide-area network like the Internet which is connected to the LAN 50. Furthermore, the E-mail address indicating where to order the toner is stored in step 109 in FIG. 3 as [toner @ yyy. co.jp], and this is all address of a dealer that handles the toner and the address is also typically in a wide-area network like the Internet which is connected to the LAN 50.

Figure 5:
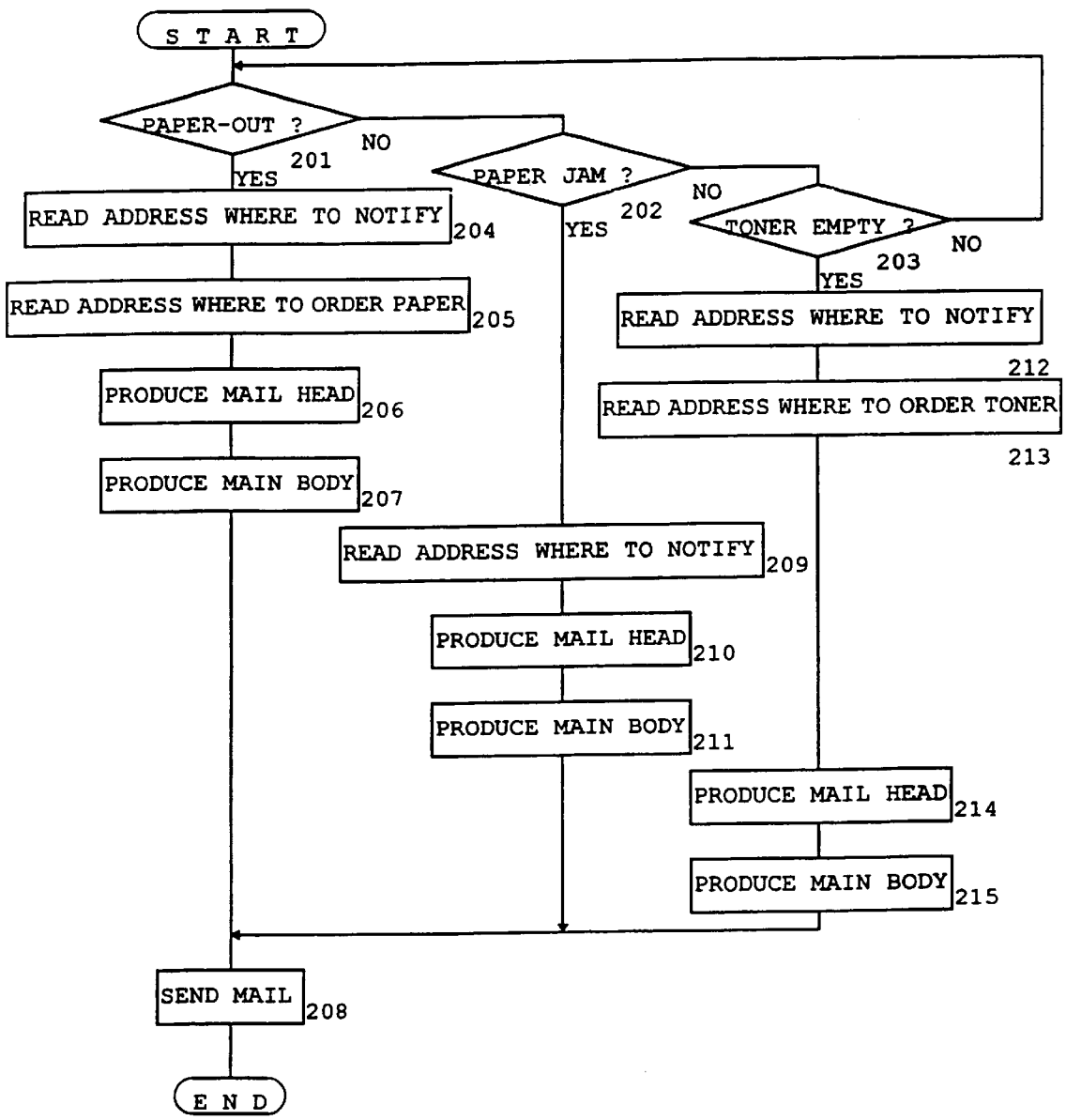
FIG. 5 is a flow chart for performing a mailing operation according to an embodiment of the present invention.

Turning now to FIG. 5, a description will be given of a mailing operation according to an embodiment of the present invention.

In FIG. 5, initially the system controller 1 continuously monitors for a paper-out (201), paper jam (202) and toner empty (203) on the basis of a signal from a paper-out sensor 13, paper jam sensor 12 and toner empty sensor 11. If there is no paper-out (No in step 201), no paper-jam (No in step 202) and no toner empty (No in step 203), the check loop steps 201–203 are repeated.

When a paper-out is detected by the paper-out sensor 13 (Yes in step 201), the system controller 1 reads out the E-mail address which indicates where to notify of the abnormal conditions, which is stored in step 103 in FIG. 1, from the parameter memory 3 (204). Further, the system controller 1 reads out an E-mail address indicating where to order the paper, which is stored in step 106 in FIG. 1, from the parameter memory 3 (205).

After that, the system controller 1 produces a mail header according to RFC822 to send the E-mail (206) and the main body of the E-mail (207).

Then, the E-mail communication control unit 10 sends the E-mail which is prepared in step 206 and step 207 to the address of the official responsible for the facsimile machine 20 in the LAN 50 (208).

One example of an E-mail format which is prepared in step 206 and step 207 is shown in FIG. 6.

In FIG. 6, the mail head is prepared according to RFC822 and includes [Date] field which shows a date of mailing, [From] field which shows a sender address, [To] field which shows a destination address [Reply-to] field which shows a return address of this mail, and [Subject] field which shows a title of the mail.

The E-mail address of the facsimile machine 20 is embedded in the [From] field. The E-mail address indicating, where to notify of the abnormal conditions is embedded in the [To] field. Further, the E-mail address indicating where to order the paper is embedded in the [Reply-to] field, and the title of the mail is embedded in the [Subject] field.

Furthermore, the message to notify of the paper-out, for example "a paper-out condition has occurred", is embedded in the main body.

Accordingly, an official responsible for the facsimile machine 20 can grasp the occurrence of the paper-out and check the backup supply of paper immediately.

Further, the main body of the E-mail includes a purchase order form to order the recording, paper and a message to an official responsible for the facsimile machine 20, which states for example "in case of necessity, please fill out a form and order the recording paper". The purchase order form includes a section to indicate paper size and number of units desired and name of the person in charge.

Accordingly, if there is no backup supply, the responsible official can order the recording paper easily by sending the E-mail to the address embedded in the [Reply-to] field.

Now, returning to FIG. 5, when a paper jam is detected by the paper jam sensor 12 (Yes in step 202), the system controller 1 reads out the E-mail address indicating where to notify of the abnormal conditions, which is stored in step 103 in FIG. 1, from the parameter memory 3 (209).

After that, the system controller 1 produces a mail head according to RFC822 used to send the E-mail (210) and the main body of the E-mail (211).

Then, the E-mail communication control unit 10 sends the E-mail which is prepared in step 210 and step 211 to the address of the official responsible for the facsimile machine 20 in the LAN 50 (208).

One example of an E-mail format which is prepared in step 210 and step 211 is shown in FIG. 7.

In FIG. 7, the mail head is prepared according to RFC822 and includes [Date] field which shows a date of mailing, [From] field which shows a sender address, [To] field which shows a destination address, and [Subject] field which shows a title of the mail.

The E-mail address of the facsimile machine 20 is embedded in the [From] field. The E-mail address indicating where to notify of the abnormal conditions is embedded in the [To] field. Further, the title of the mail is embedded in the [Subject] field. Furthermore, a message to notify of the paper jam, which states for example "a paper jam has occurred, please return the facsimile machine to its original state", is embedded in the main body.

Accordingly, an official responsible for the facsimile machine 20 can grasp the occurrence of the paper jam and return the facsimile machine 20 to its original state immediately.

Now, returning to FIG. 5, when a toner empty is detected by the toner empty sensor 11 (Yes in step 203), the system controller 1 reads out an E-mail address indicating where to notify of the abnormal conditions, which is stored in step 103 in FIG. 1, from the parameter memory 3 (212). Further the system controller 1 reads out an E-mail address indicating where to order the toner, which is stored in step 109) in FIG. 1, from the parameter memory 3 (213).

After that, the system controller 1 produces a mail head according to RFC822 used to send the E-mail (214) and the main body of the E-mail (215).

Then, the E-mail communication control unit 10 sends the E-mail which is prepared in step 214 and step 215 to the address the official responsible for the facsimile machine 20 in the LAN 50 (208).

One example of an E-mail format which is prepared in step 214 and step 215 is shown in FIG. 8.

In FIG. 8, the mail head is prepared according to RFC822 and includes [Date] field which shows a date of mailing, [From] field which shows a sender address, [To] field which shows a destination address, [Reply-to] field which shows a return address of this mail, and [Subject] field which shows a title of the mail.

The E-mail address of the facsimile machine 20 is embedded in the [From] field. The E-mail address indicating where to notify of the abnormal conditions is embedded in the [To] field. Further, the E-mail address indicating where to order the toner is embedded in the [Reply-to] field, and the title of the mail is embedded in the [Subject] field.

Furthermore, a message to notify of the toner empty condition, which states for example "a toner empty condition has occurred", is embedded in the main body.

Accordingly, an official responsible for the facsimile machine 20 can grasp the occurrence of the toner empty and can check the backup supply of toner immediately.

Further, the main body includes a purchase order form for ordering the toner and a message to an official responsible for the facsimile machine 20 which states, for example "in case of necessity, please fill out a form and order the toner". The purchase order form includes a section for indicating the type of toner, toner bottle model, and number of units and the name of the person in charge.

Accordingly, if there is no backup supply of toner, the responsible official can order the toner bottle easily by sending the E-mail to the address embedded in the [Reply-to] field.

This application is based on Japanese document 9-196422 filed in Japan on Jul. 8, 1997, and which is incorporated herein by reference in its entirety.

Numerous modifications and variations of the present invention are possible in light of the above teachings. It is therefore to be understood that within the scope of the appended claims, the invention may be practiced otherwise than as specifically described herein.

What is claimed is:

1. An image forming apparatus comprises:
   a network interface for connecting the image forming apparatus to a network as a network terminal;
   an electronic mail communication control unit for communicating an electronic mail with other network terminals through said network interface;
   a memory for storing an address of a predetermined network terminal;
   a sensor for detecting an abnormal condition of the image forming apparatus; and
   a controller for producing the electronic mail according to the address stored in the memory, the electronic mail including a notice of the occurrence of the abnormal condition, an appropriate order form selected based on the abnormal condition and an ordering address selected based on the abnormal condition.
   wherein said electronic mail communication control unit sends an electronic mail produced by said controller to the predetermined network terminal when said sensor detects an abnormal condition, wherein a user of the predetermined network terminal can determine if a supply order is necessary and, if necessary, fill in the order form and send the order form to an appropriate destination using the ordering address provided in the electronic mail.

2. An image forming apparatus according to claim 1, wherein said sensor detects an end of a consumable good used by said image forming apparatus.

3. An image forming apparatus according to claim 2, wherein said sensor detects toner empty.

4. An image forming apparatus according to claim 2, wherein said sensor detects paper-out.

5. An image forming apparatus according to claim 1, wherein said sensor detects paper jam.

6. An image forming apparatus according to claim 1, wherein said controller produces a main body of the electronic mail including the notice of the occurrence of the abnormal condition.

7. An image forming apparatus according to claim 2, wherein said memory further stores the ordering address to order the consumable goods, and said controller produces the electronic mail which includes the ordering address as additional information.

8. An image forming apparatus according to claim 7, wherein said memory stores the ordering address to order toner, and said electronic mail communication control unit sends an electronic mail produced by said controller to the predetermined network terminal when said sensor detects the toner-empty.

9. An image forming apparatus according to claim 7, wherein said memory stores the ordering address to order paper, and said electronic mail communication control unit sends an electronic mail produced by said controller to the predetermined network terminal when said sensor detects the paper-out.

10. An image forming apparatus according to claim 7, wherein said controller produces the electronic mail which includes the ordering address as an address for replying to the mail sent by said image forming apparatus.

11. An image forming apparatus management system comprising:
    a network terminal having;
       a first network interface for connecting the network terminal to a network as a network terminal;
    an image forming apparatus having;
       a second network interface for connecting the image forming apparatus to the network as a network terminal;
       an electronic mail communication control unit for communicating an electronic mail with another network terminal through said first and second network interfaces;
    a memory for storing an address of said network terminal;
    a sensor for detecting an abnormal condition of the image forming apparatus; and
    a controller for producing the electronic mail according to the address stored in the memory, the electronic mail including a notice of the occurrence of the abnormal condition, an appropriate order form selected based on the abnormal condition and an ordering address selected based on the abnormal condition, wherein said electronic mail communication control unit sends an electronic mail produced by said controller to the network terminal when said sensor detects an abnormal condition, wherein a user of the other network terminal can determine if a supply order is necessary and, if necessary, fill in the order form and send the order form to an appropriate destination using the ordering address provided in the electronic mail.

12. An image forming apparatus management system according to claim 11, wherein said sensor detects an end of a consumable good used by said image forming apparatus.

13. An image forming apparatus management system according to claim 12, wherein said sensor detects toner empty.

14. An image forming apparatus management system according to claim 12, wherein said sensor detects paper-out.

15. An image forming apparatus management system according to claim 11, wherein said sensor detects paper jam.

16. An image forming apparatus management system according to claim 11, wherein said controller produces a main body of the electronic mail including the notice of the occurrence of the abnormal condition.

17. An image forming apparatus management system according to claim 12, wherein said memory further stores the ordering address used to order said consumable goods, and said controller produces the electronic mail which includes the ordering address as an additional information.

18. An image forming apparatus management system according to claim 17, wherein said memory stores the ordering address used to order toner, and said electronic mail communication control unit sends an electronic mail produced by said controller to said network terminal when said sensor detects that the toner is empty.

19. An image forming apparatus management system according to claim 17, wherein said memory stores the ordering address used to order paper, and said electronic mail communication control unit sends an electronic mail produced by said controller to said network terminal when said sensor detects the paper-out.

20. An image forming apparatus management system according to claim 17, wherein said controller produces the electronic mail which includes the ordering address as an address used for replying to the mail sent by said image forming apparatus.

21. An image forming apparatus management system according to claim 17, wherein said network terminal sends an electronic mail to the ordering address.

22. An image forming method comprising steps of:
providing an image forming apparatus on a network as a network terminal;
an electronic mail communication control step for communicating an electronic mail with other network terminals through said network;
storing an address of a predetermined network terminal;
detecting, an abnormal condition of the image forming apparatus; and
producing the electronic mail according to the address stored in the memory, the electronic mail including a notice of the occurrence of the abnormal condition, an appropriate order form selected based on the abnormal condition and an ordering address selected based on abnormal condition, wherein said electronic mail communication control step sends an electronic mail to the predetermined network terminal when said detection step detects an abnormal condition, wherein a user of the predetermined network terminal can determine if a supply order is necessary and, if necessary, fill in the order form and send the order form to an appropriate destination using the ordering address provided in the electronic mail.

23. An image forming method according to claim 22, wherein said detection step detects an end of a consumable good used by said image forming apparatus.

24. An image forming method according to claim 23, wherein said detection step detects toner empty.

25. An image forming method according to claim 23, wherein said detection step detects paper-out.

26. An image forming method according to claim 22, wherein said detection step detects paper jam.

27. An image forming method according to claim 22, wherein said producing step produces a main body of the electronic mail including the notice of the occurrence of the abnormal condition.

28. An image forming method according to claim 23, wherein said storing step further stores an ordering address to order the consumable goods, and said producing step produces the electronic mail which includes the ordering address as additional information.

29. An image forming method according to claim 28, wherein said storing step stores an ordering address to order toner, and said electronic mail communication control step sends an electronic mail to the predetermined network terminal when said detection step detects the toner-empty.

30. An image forming method according to claim 28, wherein said storing step stores an ordering address to order paper, and said electronic mail communication control step sends an electronic mail produced by said producing step to the predetermined network terminal when said detection step detects the paper-out.

31. An image forming method according to claim 28, wherein said producing step produces the electronic mail which includes the ordering address as an address for replying to the mail sent by said image forming apparatus.

32. An image forming apparatus management method comprising steps of:
providing a first network interface for connecting a network terminal to a network as a network terminal;
providing a second network interface for connecting an image forming apparatus to the network as a network terminal;
an electronic mail communication control step for communicating an electronic mail with another network terminal through said first and second network interfaces;
a storing step for storing an address of said network terminal;
a detection step for detecting an abnormal condition of the image forming apparatus; and
a producing step for producing the electronic mail according to the address stored in the storing step, the electronic mail including a notice of the occurrence of the abnormal condition, an appropriate order form selected based on the abnormal condition and an ordering address selected based on the abnormal condition, wherein said electronic mail communication control step sends an electronic mail produced by said producing step to the network terminal when said detection step detects an abnormal condition, wherein a user of the other network terminal can determine if a supply order is necessary and, if necessary, fill in the order form and send the order form to an appropriate destination using the ordering address provided in the electronic mail.

33. An image forming apparatus management method according to claim 32, wherein said detection step detects an end of a consumable good used by said image forming apparatus.

34. An image forming apparatus management method according to claim 33, wherein said detection step detects toner empty.

35. An image forming apparatus management method according to claim 33, wherein said detection step detects paper-out.

36. An image forming apparatus management method according to claim 32, wherein said detection step detects paper jam.

37. An image forming apparatus management method according to claim 32, wherein said producing step produces a main body of the electronic mail including the notice of the occurrence of the abnormal condition.

38. An image forming apparatus management method according to claim 33, wherein said storing step further stores an ordering address used to order said consumable goods, and said producing step produces the electronic mail which includes the ordering address as an additional information.

39. An image forming apparatus management method according to claim 38, wherein said storing step stores an ordering address used to order toner, and said electronic mail communication step sends an electronic mail produced by said producing step to said network terminal when said detection step detects that the toner is empty.

40. An image forming apparatus management method according to claim 38, wherein said storing step stores an ordering address used to order paper, and said electronic mail communication control step sends an electronic mail produced by said producing step to said network terminal when said detection step detects the paper-out.

41. An image forming apparatus management method according to claim 38, wherein said producing step produces the electronic mail which includes the ordering address as an address used for replying to the mail sent by said image forming apparatus.

42. An image forming apparatus management method according to claim 38, wherein said network terminal sends an electronic mail to the ordering address.

* * * * *